US012606043B2

(12) United States Patent　　　　　(10) Patent No.:　US 12,606,043 B2
Alarcon et al.　　　　　　　　　　　　(45) Date of Patent:　　Apr. 21, 2026

(54) METHODS, VEHICLE SYSTEMS, AND VEHICLES FOR MANAGING ENERGY TRANSFER FROM A PORTABLE ENERGY SOURCE

(71) Applicant: GM GLOBAL TECHNOLOGY OPERATIONS LLC, Detroit, MI (US)

(72) Inventors: Michael D. Alarcon, Markham (CA); Grant L. Meade, Whitby (CA); Manvir Dulai, Brampton (CA); Steve Ashley Warden, Port Perry (CA); Ralph David Schlottke, Whitby (CA); Asadullah Noorzaie, Scarborough (CA); Christian Teixeira, Saint Louis, MO (US); Bridget A. Beaton, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 18/479,341

(22) Filed: Oct. 2, 2023

(65) Prior Publication Data

US 2025/0108716 A1　　Apr. 3, 2025

(51) Int. Cl.
　　B60L 53/57　　　　(2019.01)
　　B60D 1/64　　　　(2006.01)
　　　　　　(Continued)

(52) U.S. Cl.
　　CPC ................ B60L 53/57 (2019.02); B60D 1/64 (2013.01); B60L 53/16 (2019.02); B60L 53/62 (2019.02);
　　　　　　(Continued)

(58) Field of Classification Search
　　CPC .......... B60L 53/57; B60L 53/16; B60L 53/62; B60L 53/63; B60L 53/66; B60L 1/006;
　　　　　　(Continued)

(56) References Cited

U.S. PATENT DOCUMENTS 10,093,195 B2　10/2018　Ricci
11,381,101 B1 *　7/2022　Mallia ................... H01M 10/48
　　　　　　(Continued)

FOREIGN PATENT DOCUMENTS

DE　　102016222024 A1　11/2016
EP　　　　4008577 A1　　8/2022

OTHER PUBLICATIONS

Road Vehicles—Vehicle to grid communication interface—Part 1: General information and use-case definition (ISO 15118-1:2013); English version EN ISO 15118-1:2015.

*Primary Examiner* — Nga X Nguyen
(74) *Attorney, Agent, or Firm* — Ingrassia Fisher & Lorenz, LLP | IF&L

(57)　　　　　　ABSTRACT

Methods, vehicle systems, and vehicles are provided that are capable of managing communication between a vehicle and a portable energy source (PES) coupled to the vehicle. The vehicle systems include a vehicle battery configured to provide electrical power to a propulsion system of the vehicle and a vehicle controller that is configured to establish two-way data communication between the vehicle controller and a PES controller of the PES, determine an energy transfer mode for transferring electrical power between the vehicle battery and a PES battery of the PES, initiate electrical power transfer between the vehicle battery and the PES battery in accordance with the energy transfer mode while the vehicle is being propelled by the propulsion system, receive a status of the PES battery from the PES controller, and adjust the electrical power transfer between the vehicle battery and the PES battery based on the status.

11 Claims, 5 Drawing Sheets

(51) Int. Cl.

| | |
|---|---|
| *B60L 53/16* | (2019.01) |
| *B60L 53/62* | (2019.01) |
| *B60L 53/63* | (2019.01) |
| *B60L 53/66* | (2019.01) |
| *H02J 7/00* | (2026.01) |
| *H02J 7/90* | (2026.01) |

(52) U.S. Cl.
CPC ............... *B60L 53/63* (2019.02); *B60L 53/66*
(2019.02); *H02J 7/933* (2026.01)

(58) Field of Classification Search
CPC .......... B60L 53/14; B60L 55/00; B60L 58/12;
B60D 1/64; H02J 7/00712; H02J 7/933;
Y02T 10/70; Y02T 10/7072
See application file for complete search history.

(56) References Cited

U.S. PATENT DOCUMENTS

| | | | | |
|---|---|---|---|---|
| 2010/0141201 A1* | 6/2010 | Littrell | .................... | H02S 40/32 |
| | | | | 320/101 |
| 2016/0052409 A1* | 2/2016 | Sun | ......................... | B60L 53/62 |
| | | | | 320/109 |
| 2017/0240059 A1 | 8/2017 | Weicker | | |
| 2019/0359073 A1* | 11/2019 | Song | ..................... | H02J 7/0068 |
| 2023/0038012 A1* | 2/2023 | Erozlu | .............. | G01C 21/3679 |
| 2024/0317095 A1* | 9/2024 | Hassani | .................. | B60L 53/16 |
| 2024/0332970 A1* | 10/2024 | Gorman | .................. | B60L 50/75 |

* cited by examiner

400

METHODS, VEHICLE SYSTEMS, AND VEHICLES FOR MANAGING ENERGY TRANSFER FROM A PORTABLE ENERGY SOURCE

The technical field generally relates to electric vehicle charging, and more particularly relates to systems and methods of managing energy transfer between a vehicle and a portable energy source.

Electric vehicle range refers to the maximum distance an electric vehicle can travel on a single charge or a full battery cycle before the battery needs to be recharged. Range may vary by vehicle model and may be influenced by various factors, including battery capacity, driving conditions, and weather. Electric vehicle range is an important factor in the adoption and practicality of electric transportation.

Accordingly, it is desirable to provide systems and methods capable of promoting extended range for electric vehicles. Furthermore, other desirable features and characteristics of the present disclosure will become apparent from the subsequent detailed description and the appended claims, taken in conjunction with the accompanying drawings and the foregoing introduction.

SUMMARY

A method is provided for managing energy transfer between a vehicle and a portable energy source. In one embodiment, the method includes establishing two-way data communication between a vehicle controller of the vehicle and a portable energy source (PES) controller of the PES coupled to the vehicle, determining an energy transfer mode for transferring electrical power between a vehicle battery of the vehicle and a PES battery of the PES, initiating electrical power transfer between the vehicle battery and the PES battery in accordance with the energy transfer mode while the vehicle is being propelled by a propulsion system of the vehicle powered by the vehicle battery, receiving, with the vehicle controller, PES data indicative of a status of the PES battery from the PES controller while the vehicle is being propelled by the propulsion system, and adjusting, with the vehicle controller, the electrical power transfer between the vehicle battery and the PES battery based on the status of the PES battery.

In various examples, the method includes performing, with the vehicle controller, a safety check to verify that the PES is configured to provide the electrical power to the vehicle while the vehicle is in motion and to verify that the PES is coupled to the vehicle. In some examples, the method includes receiving, with the vehicle controller, a Media Access Control (MAC) address of the PES, and identifying, with the vehicle controller, the PES by comparing the MAC address to a database of PES MAC addresses.

In various examples, the vehicle and the PES of the method are coupled with a seven pin trailer connector and a charging connector, wherein the two-way data communication is provided by powerline communication through the seven pin trailer connector and the charging connector.

In various examples, the energy transfer mode of the method is a maximum forward charge mode wherein forward charging is performed at a maximum charging rate while an SOC of the PES battery is above a PES SOC threshold.

In various examples, the energy transfer mode of the method is a target mode wherein a target is set for either an SOC of the vehicle battery or an SOC of the PES battery, wherein the SOC of the vehicle battery or the SOC of the PES battery is monitored and the energy transfer is adjusted based on the SOC of the vehicle battery or the SOC of the PES battery relative to the target.

In various examples, the energy transfer mode of the method is a dolly/off-grid mode wherein forward charging is limited, an SOC of the vehicle battery is monitored, and the energy transfer is adjusted when the SOC of the vehicle battery is below a dolly/off-grid threshold.

In various examples, the energy transfer mode of the method is a weightless trailer mode wherein forward charge is provided at a charge rate that offsets an extra charge needed for transporting the PES with the vehicle.

A vehicle system is provided for communication between a vehicle and a portable energy source (PES) coupled to the vehicle. In one example, the vehicle system includes a vehicle battery configured to provide electrical power to a propulsion system of the vehicle and a vehicle controller in operable communication with the vehicle battery. The vehicle controller is configured to, by one or more processors: establish two-way data communication between the vehicle controller and a PES controller of the PES; determine an energy transfer mode for transferring electrical power between the vehicle battery and a PES battery of the PES; initiate electrical power transfer between the vehicle battery and the PES battery in accordance with the energy transfer mode while the vehicle is being propelled by the propulsion system; receive PES data indicative of a status of the PES battery from the PES controller while the vehicle is being propelled by the propulsion system; and adjust the electrical power transfer between the vehicle battery and the PES battery based on the status of the PES battery.

In various examples, the vehicle controller of the vehicle system is configured to, by the one or more processors, perform a safety check to verify that the PES is configured to provide the electrical power to the vehicle while the vehicle is in motion and to verify that the PES is coupled to the vehicle. In various examples, the vehicle controller of the vehicle system is configured to, by the one or more processors: receive a Media Access Control (MAC) address of the PES; and identify the PES by comparing the MAC address to a database of PES MAC addresses.

In various examples, the vehicle and the PES are coupled with a seven pin trailer connector and a charging connector, and the vehicle controller of the vehicle system is configured to, by the one or more processors, provide the two-way data communication by powerline communication through the seven pin trailer connector and the charging connector.

In various examples, the energy transfer mode executed by the vehicle system is a maximum forward charge mode wherein forward charging is performed at a maximum charging rate while an SOC of the PES battery is above a PES SOC threshold.

In various examples, the energy transfer mode executed by the vehicle system is a target mode wherein a target is set for either an SOC of the vehicle battery or an SOC of the PES battery, wherein the SOC of the vehicle battery or the SOC of the PES battery is monitored and the energy transfer is adjusted based on the SOC of the vehicle battery or the SOC of the PES battery relative to the target.

In various examples, the energy transfer mode executed by the vehicle system a dolly/off-grid mode wherein forward charging is limited, an SOC of the vehicle battery is monitored, and the energy transfer is adjusted when the SOC of the vehicle battery is below a dolly/off-grid threshold.

In various examples, the energy transfer mode executed by the vehicle system is a weightless trailer mode wherein forward charge is provided at a charge rate that offsets an extra charge needed for transporting the PES with the vehicle.

A vehicle is provided that, in one example, includes a propulsion system, a vehicle battery configured to provide electrical power to the propulsion system sufficient for operation of the propulsion system, and a vehicle controller in operable communication with the propulsion system and the vehicle battery. The vehicle controller configured to, by one or more processors: establish two-way data communication between the vehicle controller and a portable energy source (PES) controller of the PES; determine an energy transfer mode for transferring electrical power between the vehicle battery and a PES battery of the PES; initiate electrical power transfer between the vehicle battery and the PES battery in accordance with the energy transfer mode while the vehicle is being propelled by the propulsion system; receive PES data indicative of a status of the PES battery from the PES controller while the vehicle is being propelled by the propulsion system; and adjust the electrical power transfer between the vehicle battery and the PES battery based on the status of the PES battery.

In various examples, the vehicle controller of the vehicle is configured to, by the one or more processors, perform a safety check to verify that the PES is configured to provide the electrical power to the vehicle while the vehicle is in motion and to verify that the PES is coupled to the vehicle.

In various examples, the vehicle and the PES are coupled with a seven pin trailer connector and a charging connector, and the vehicle controller of the vehicle is configured to, by the one or more processors, provide the two-way data communication by powerline communication through the seven pin trailer connector and the charging connector.

In various examples, the vehicle controller of the vehicle is configured to, by the one or more processors, execute the energy transfer mode in accordance with one of a plurality of selectable energy transfer modes including a maximum forward charge mode wherein forward charging is performed at a maximum charging rate while an SOC of the PES battery is above a PES SOC threshold, a target mode wherein a target is set for either an SOC of the vehicle battery or the SOC of the PES battery, wherein the SOC of the vehicle battery or the SOC of the PES battery is monitored and the energy transfer is adjusted based on the SOC of the vehicle battery or the SOC of the PES battery relative to the target, a dolly/off-grid mode wherein forward charging is limited, an SOC of the vehicle battery is monitored, and the energy transfer is adjusted when the SOC of the vehicle battery is below a dolly/off-grid threshold, and a weightless trailer mode wherein forward charge is provided at a charge rate that offsets an extra charge needed for transporting the PES with the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
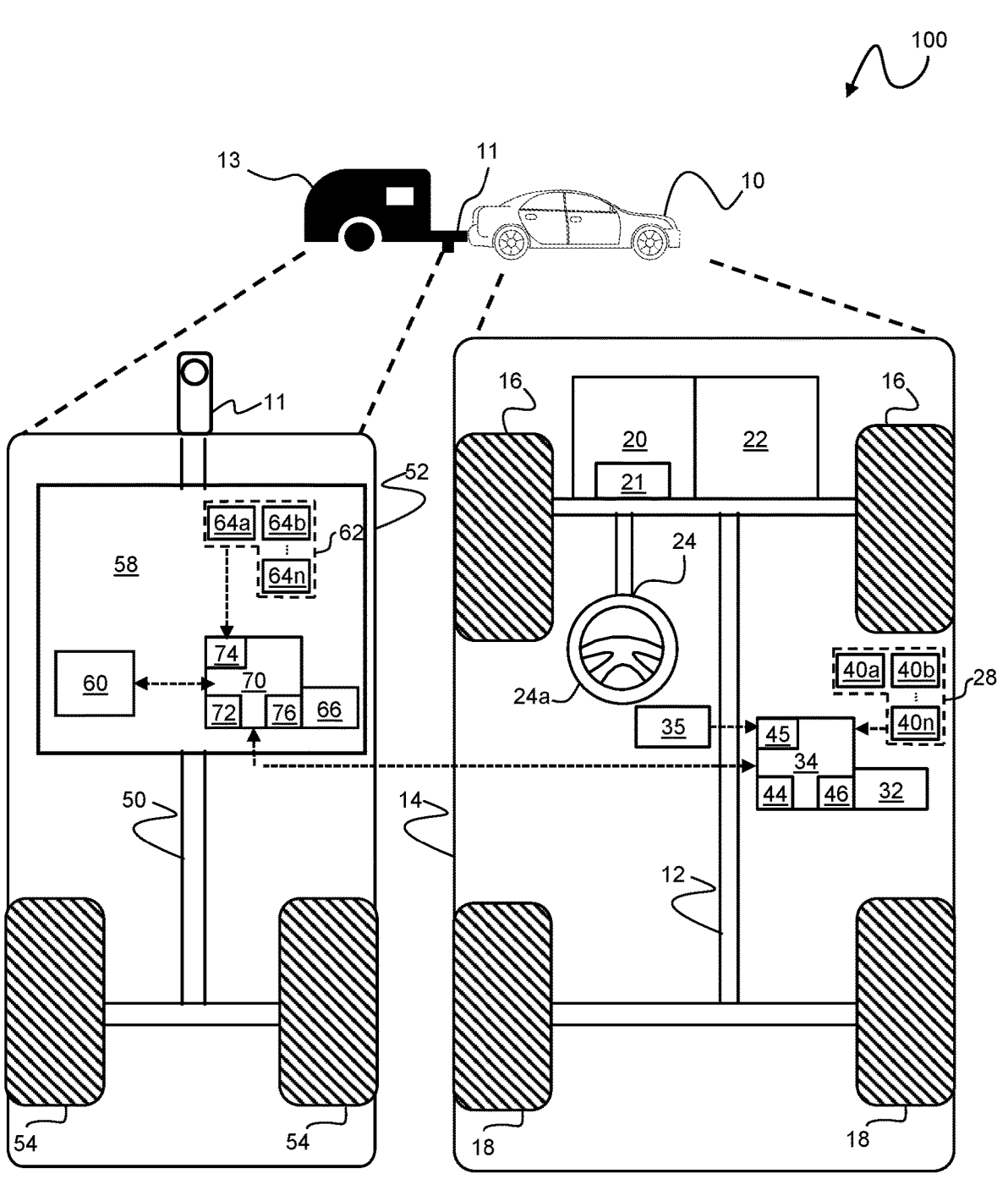
FIG. 1 is a functional block diagram of a vehicle having a PES management system and an associated trailer having a PES in accordance with an embodiment.

FIG. 1 illustrates a vehicle 10, according to an exemplary embodiment, that includes a portable energy source (PES) management system shown generally at 100. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments.

In various embodiments, the vehicle 10 may be associated with an electric vehicle supply equipment (EVSE) configured for use as a portable energy supply (PES) 58 capable of charging the vehicle 10 while the vehicle 10 is in motion.

The PES 58 is not limited to any particular configuration. In some examples, the PES 58 may be configured to be stowed in a cargo area of the vehicle 10. In the example of FIG. 1, the PES 58 is configured as a trailer 13 coupled to the vehicle 10. As can be appreciated, the trailer 13 may be any type of towable application having one or more wheels and is not limited to any one embodiment. The vehicle 10 is configured to couple to and connect to the trailer 13 via a connection apparatus 11 and is configured to tow the trailer 13. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to and from components of the trailer 13. In some examples, the wiring harness is a seven pin trailer connector.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The exemplary trailer 13 includes a chassis 50, a body 52, and wheels 54. The body 52 is arranged on the chassis 50 and substantially encloses components of the trailer 13. The body 52 and the chassis 50 may jointly form a frame. The wheels 54 are each rotationally coupled to the chassis 50 near a respective sides of the body 52.

The vehicle 10 further includes a propulsion system 20, a transmission system 22, a steering system 24, a vehicle sensor system 28, at least one vehicle data storage device 32, at least one vehicle controller 34, and at least one vehicle battery 35. The propulsion system 20 includes an electric motor 21 powered by the vehicle battery 35. The propulsion system 20 may operate exclusively by the electric motor 21 or may be a hybrid system that includes the electric motor 21 and an engine, such as an internal combustion engine. The vehicle battery 35 may be any type of rechargeable battery capable of powering the propulsion system 20, such as a lithium ion cell. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The steering system 24 influences a position of the wheels 16-18. While depicted as including a steering wheel 24a for illustrative purposes, in some embodiments contemplated within the scope of the present disclosure, the steering system 24 may not include a steering wheel.

The trailer 13 further includes a PES battery 60, a PES sensor system 62, at least one PES data storage device 66, and at least one PES controller 70. The PES battery 60 may be any type of rechargeable battery capable of charging the vehicle battery 35, such as a lithium ion cell. In various embodiments, the PES 58 may include one or more systems for generating power for charging the PES battery 60 and/or the vehicle battery 35. For example, the PES 58 may include an internal combustion engine/motor (e.g., gasoline or diesel burning), a fuel cell, or various other types of systems.

The vehicle sensor system 28 includes one or more vehicle sensing devices 40a-40n that sense observable conditions of the exterior environment, the interior environment, and/or a status or condition of a corresponding component of the vehicle 10 and provide such condition and/or status to other systems of the vehicle 10, such as the vehicle controller 34. It should be understood that the vehicle 10 may include any number of the vehicle sensing devices 40a-40n. The vehicle sensing devices 40a-40n can include, but are not limited to, speed sensors, battery system sensors, device status and feedback sensors, etc.

The PES sensor system 62 includes one or more PES sensing devices 64a-64n that sense observable conditions of a status or condition of a corresponding component of the trailer 13 and provide such condition and/or status to other systems of the trailer 13, such as the PES controller 70. It should be understood that the trailer 13 may include any number of the PES sensing devices 64a-64n. The PES sensing devices 64a-64n can include, but are not limited to, battery system sensors, crash detection sensors, device status and feedback sensors, etc.

The vehicle data storage device 32 and the PES data storage device 66 store data for use in controlling the vehicle 10 or the trailer 13, respectively, and/or systems and components thereof. As can be appreciated, the vehicle data storage device 32 may be part of the vehicle controller 34, separate from the vehicle controller 34, or part of the vehicle controller 34 and part of a separate system. Similarly, the PES data storage device 66 may be part of the PES controller 70, separate from the PES controller 70, or part of the PES controller 70 and part of a separate system.

The vehicle data storage device 32 and the PES data storage device 66 can each be any suitable type of storage apparatus, including various different types of direct access storage and/or other memory devices. In one exemplary embodiment, the vehicle data storage device 32 and/or the PES data storage device 66 comprises a program product from which a computer readable memory device can receive a program that executes one or more embodiments of one or more processes of the present disclosure, such as the steps of the process discussed further below in connection with FIG. 4. In another exemplary embodiment, the program product may be directly stored in and/or otherwise accessed by the memory device and/or one or more other disks and/or other memory devices.

The vehicle controller 34 includes at least one processor 44, a communication bus 45, and a computer readable storage device or media 46, and the PES controller 70 includes at least one processor 72, a communication bus 74, and a computer readable storage device or media 76. The processors 44 and 72 each perform the computation and control functions of the vehicle controller 34 and the PES controller 70, respectively. The processors 44 and 72 can be any custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, any combination thereof, or generally any device for executing instructions. The computer readable storage device or media 46 and 76 may include volatile and nonvolatile storage in read-only memory (ROM), random-access memory (RAM), and keep-alive memory (KAM), for example. KAM is a persistent or non-volatile memory that may be used to store various operating variables while the processors 44 and/or 72 are powered down. The computer-readable storage device or media 46 and 76 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the vehicle controller 34 in controlling the vehicle 10 or by the PES controller 70 in controlling the trailer 13. The buses 45 and 76 serve to transmit programs, data, status and other information or signals between the various components of the vehicle 10 and the trailer 13, respectively. The buses 45 and 76 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processors 44 and/or 72, receive and process signals, perform logic, calculations, methods and/or algorithms, and generate data based on the logic, calculations, methods, and/or algorithms. Although only one of each of the vehicle controller 34 and the PES controller 70 are shown in FIG. 1, embodiments of the vehicle 10 and the trailer 13 can include any number of vehicle controllers 34 and PES controllers 70 that communicate over any suitable communication medium or a combination of communication mediums and that cooperate to process the sensor signals, perform logic, calculations, methods, and/or algorithms, and generate data.

As can be appreciated, the vehicle controller 34 and/or the PES controller 70 may otherwise differ from the embodiment depicted in FIG. 1. For example, the vehicle controller 34 and/or the PES controller 70 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processors 44 and/or 72) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the vehicle controller 34 and/or the PES controller 70 may also otherwise differ from the embodiment depicted in FIG. 1, for example in that the computer systems of the vehicle controller 34 and/or the PES controller 70 may be coupled to or may otherwise utilize one or more remote computer systems and/or other control systems.

Figure 2:
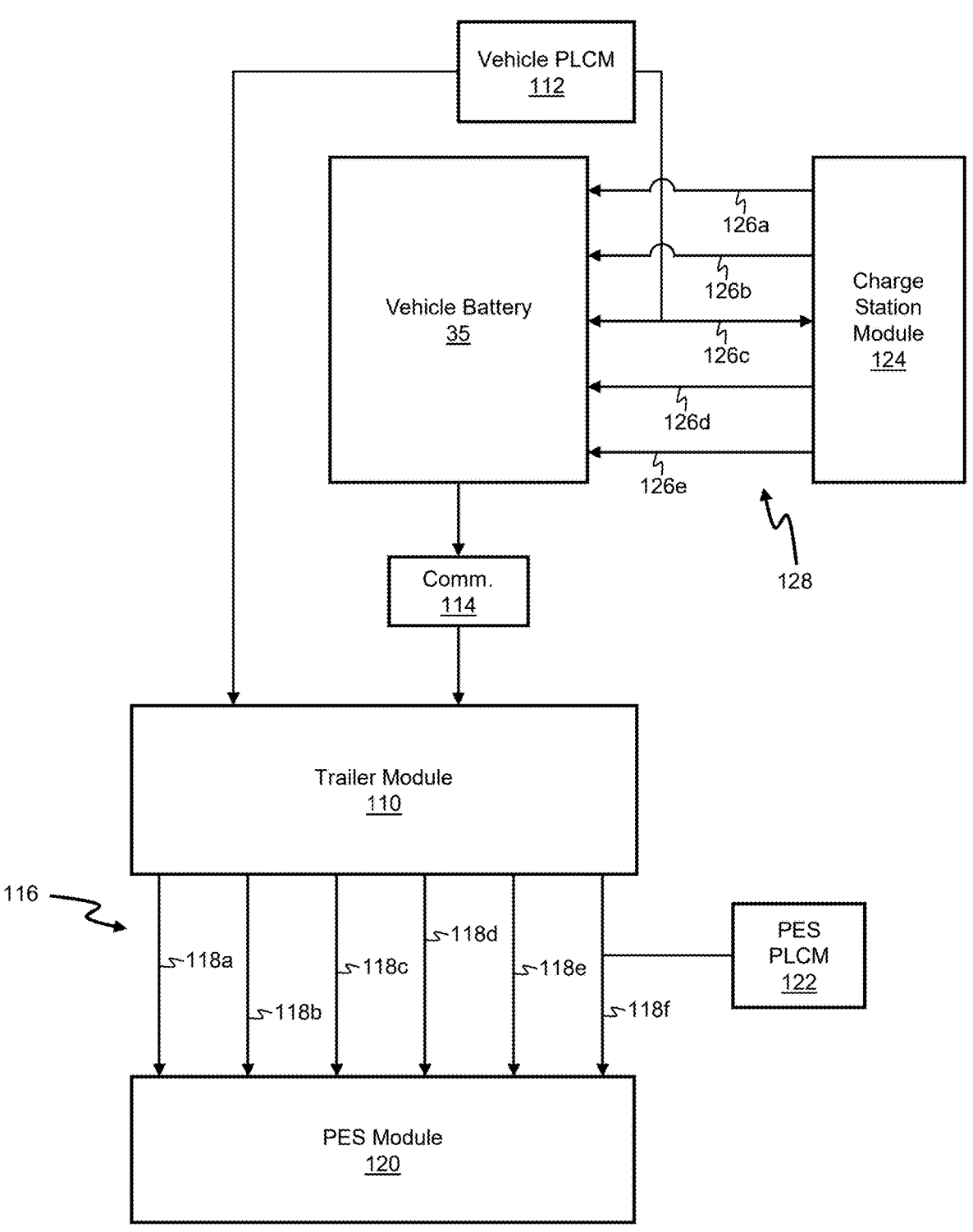
FIG. 2 is an architecture diagram of the PES management system of FIG. 1 in accordance with an embodiment.

With reference to FIG. 2 and with continued reference to FIG. 1, a partial architecture diagram illustrates elements of the PES management system 100 of FIG. 1 in accordance with various examples. In this example, the vehicle battery 35 is configured to be charged via a charging station module

124 coupled to the vehicle battery 35 by a charging connector 128. In this example, the charging connector 128 includes five wires including a direct current (DC) positive line 126a, a DC negative line 126b, a control pilot line 126c, a proximity line 126d, and a ground line 126e. A trailer module 110 may be coupled to the control pilot line 126c by a vehicle powerline communication module (PLCM) 112 and to the vehicle battery 35 by a communication bus or network 114, such as a distributed controller area network (CAN) system of the vehicle 10 or a wireless communication system (e.g., Bluetooth™). The trailer module 110 may be coupled to a PES module 120 of the PES 58 by a suitable connector. In this example, the trailer module 110 is coupled to the PES module 120 by a seven pin trailer connector 116 that includes a tail lights line 118a, a left turn brake light line 118b, a right turn brake light line 118c, a trailer brakes line 118d, a ground line 118e, and a 12 volt power line 118f. A PES PLCM 122 of the PES 58 may be coupled to the 12 volt power line 118f. It should be understood that the charging connector 128 and the trailer connector 116 may have fewer or more wires. Although the examples discussed herein refer to level DC charging applications, the PES 58 may provide other charging configurations. For example, the PES 58 may be configured to provide level 2 AC charging rather than DC charging.

Figure 3:
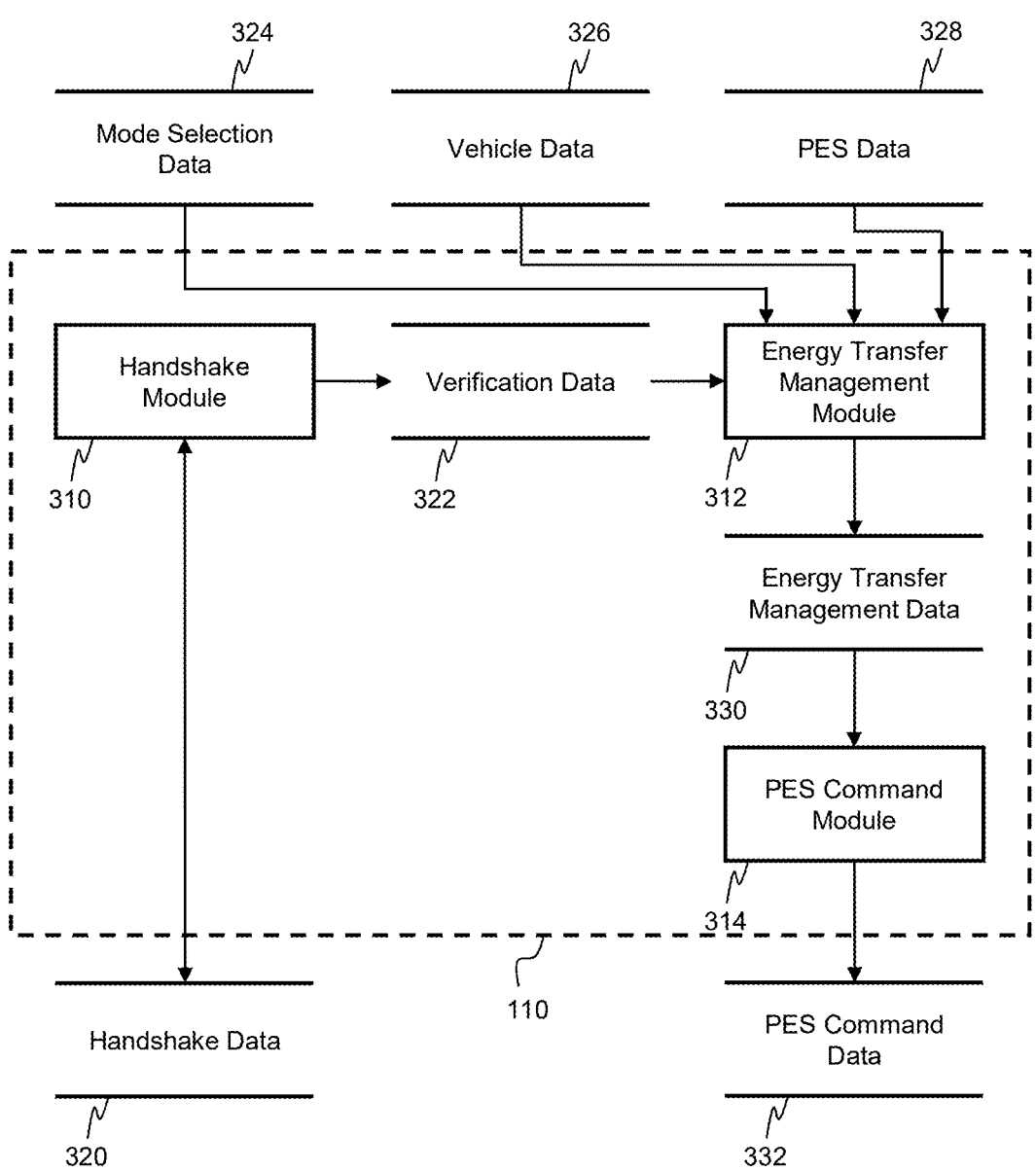
FIG. 3 is a dataflow diagram illustrating certain elements of the PES management system of FIG. 1 in accordance with an embodiment.

With reference to FIG. 3 and with continued reference to FIGS. 1-2, a dataflow diagram illustrates elements of the trailer module 110 and/or the PES management system 100 of FIG. 1 in accordance with various examples. As can be appreciated, various examples of the trailer module 110 and/or the PES management system 100 according to the present disclosure may include any number of modules embedded within the vehicle controller 34 which may be combined and/or further partitioned to similarly implement systems and methods described herein. Furthermore, inputs to the trailer module 110 and/or the PES management system 100 may be received from other control modules (not shown) associated with the vehicle 10, and/or determined/modeled by other sub-modules (not shown) within the vehicle controller 34. Furthermore, the inputs might also be subjected to preprocessing, such as sub-sampling, noise-reduction, normalization, feature-extraction, missing data reduction, and the like. In various examples, the trailer module 110 and/or the PES management system 100 includes a handshake module 310, an energy transfer management module 312, and a PES command module 314.

In various embodiments, the handshake module 310 receives as input handshake data 320 generated by the PES module 120 and/or the PES controller 70. The handshake data 320 includes various data indicating whether it is safe to initiate energy transfer between the PES 58 and the vehicle 10. For example, the handshake data 320 may indicate that the PES 58 is coupled to the vehicle 10, identification information relating to the PES 58, and/or configuration information of the PES 58.

The handshake module 310 communicates with the PES module 120 and/or the PES controller 70 as necessary via PLC through the trailer connector 116 and/or the charging connector 128. The handshake module 310 processes the handshake data 320 received to determine whether to initiate energy transfer between the PES 58 and the vehicle 10. Upon a determination that energy transfer between the PES 58 and the vehicle 10 is allowable, the handshake module 310 generates verification data 322 indicating such determination.

In various embodiments, the energy transfer management module 312 receives as input the verification data 322 generated by the handshake module 310. The energy transfer management module 312 also receives as input mode selection data 324 that includes various information indicating which of one or more energy transfer modes is selected for the energy transfer process. In various embodiments, the mode selection data 324 may be generated by user interaction with a selection control, such as a graphic user interface.

The energy transfer management module 312 also receives as input vehicle data 326 generated by the vehicle sensor system 28, the vehicle controller 34, and/or other components of the vehicle 10. The vehicle data 326 may include various information indicating an operating status of the vehicle 10 and/or various characteristics of the vehicle battery 35. In some examples, the vehicle data 326 may indicate various characteristics of the vehicle 10 including a steering wheel angle, a brake pedal position, an accelerator pedal position, a percentage of the applied braking pressure, a steering angle, a speed, inertial measurements, diagnostic trouble codes, hitch articulation angle, tire pressure, etc. In some examples, the vehicle data 326 may indicate various characteristics of the vehicle battery 35 including a state of charge (SOC), a charge rate, diagnostic trouble codes, etc.

The energy transfer management module 312 also receives as input PES data 328 generated by the PES sensor system 62, the PES controller 70, and/or other components of the PES 58 and/or the trailer 13. The PES data 328 may include various information indicating an operating status of the trailer 13, an operating status of the PES 58, and/or various characteristics of the PES battery 60. In some examples, the PES data 328 may indicate an SOC of the PES battery 60, diagnostic trouble codes, trailer crash detection, etc.

The energy transfer management module 312 performs management of the energy transfer process in accordance with the selected energy transfer mode and may adjust the energy transfer process based on the vehicle data 326 and/or the PES data 328. The energy transfer management module 312 generates energy transfer management data 330 that may include various information indicating desired energy transfer process parameters.

In various embodiments, the PES command module 314 receives as input energy transfer management data 330 generated by the energy transfer management module 312. The PES command module 314 processes the energy transfer management data 330 and generates PES command data 332 that includes various information indicating operating parameters of the PES 58 necessary to achieve the desired energy transfer process parameters. The PES command module 314 may transmit the PES command data 332 to the PES controller 70 to adjust the energy transfer process.

Figure 4:
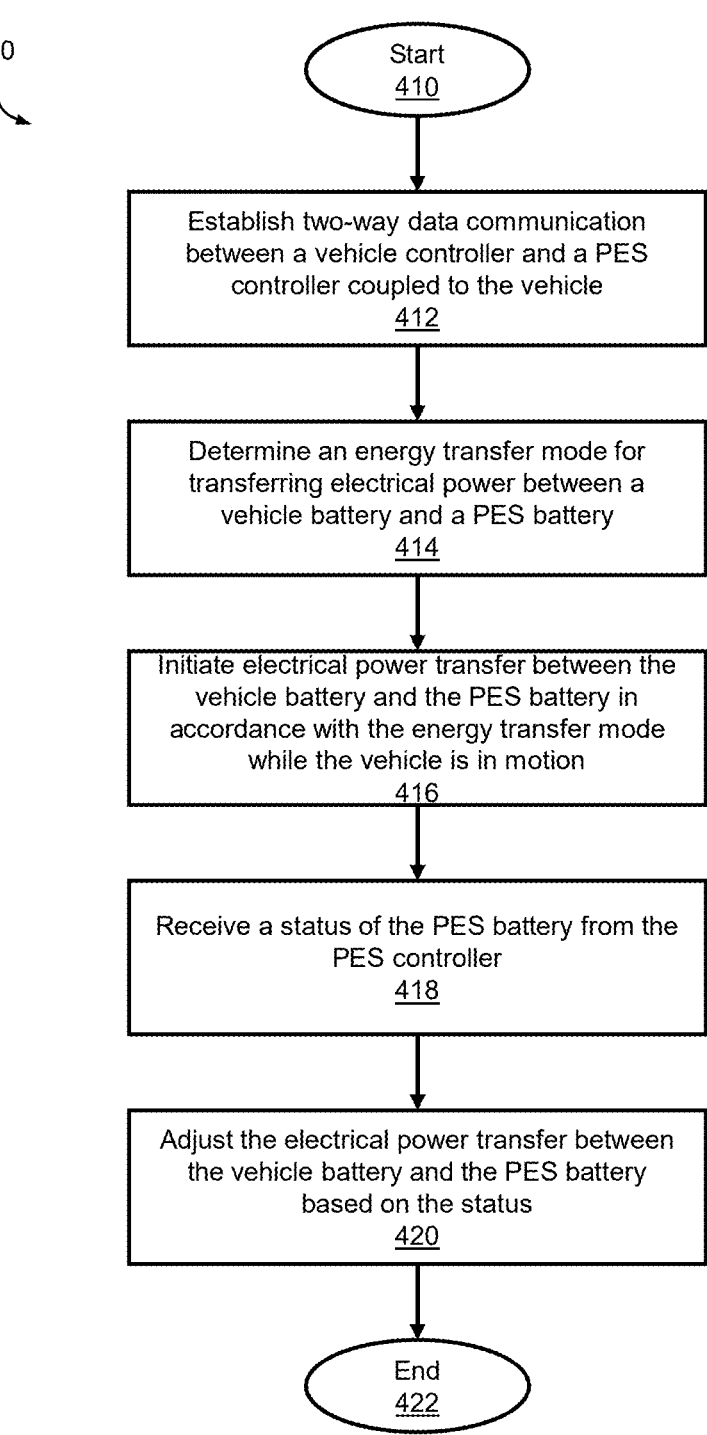
FIG. 4 is a flowchart of a method for managing energy transfer between a PES and a vehicle as performed by the PES management system of FIG. 1 in accordance with an embodiment.

With reference now to FIG. 4 and with continued reference to FIGS. 1-3, a flowchart provides a method 400 for managing energy transfer between the PES 58 and the vehicle 10 as performed by the PES management system 100, in accordance with various examples. As can be appreciated in light of the disclosure, the order of operation within the method 400 is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10.

In one example, the method 400 may start at 410. In some examples, the method 400 may be continuously performed during operation of the vehicle 10. In some examples, the method 400 may be executed or initiated upon physically connecting the PES 58 to the vehicle 10. In some examples, the method 400 may be executed or initiated upon instruction by a user, for example, via a selection on a graphic user interface.

As 412, the method 400 may include establishing two-way data communication between the vehicle controller 34 of the vehicle 10 and the PES controller 70 of the PES 58 coupled to the vehicle 10. In some examples, the two way communication may be performed by one or more communication connections including but not limited to PLC via the charging connector 128, PLC via the trailer connector 116, and a wireless communication system (e.g., Bluetooth™).

As 414, the method 400 may include determining an energy transfer mode for transferring electrical power between the vehicle battery 35 of the vehicle 10 and the PES battery 60 of the PES 58. In some examples, the energy transfer mode may be determined based on a user selection of one of various energy transfer modes.

As 416, the method 400 may include initiating electrical power transfer between the vehicle battery 35 and the PES battery 60 in accordance with the energy transfer mode while the vehicle 10 is being propelled by the propulsion system 20 of the vehicle 10 which is powered by the vehicle battery 35. In some examples, the electrical power transfer process may be initiated upon successful completion of a safety check or handshake process between the vehicle 10 and the PES 58.

As 418, the method 400 may include receiving, with the vehicle controller 34, PES data indicative of a status of the PES battery 60 from the PES controller 70 while the vehicle 10 is being propelled by the propulsion system 20.

As 420, the method 400 may include adjusting, with the vehicle controller 34, the electrical power transfer between the vehicle battery 35 and the PES battery 60 based on the status of the PES battery 60, the status of the vehicle battery 35, operating conditions of the vehicle 10, etc. The method 400 may end at 422.

Figure 5:
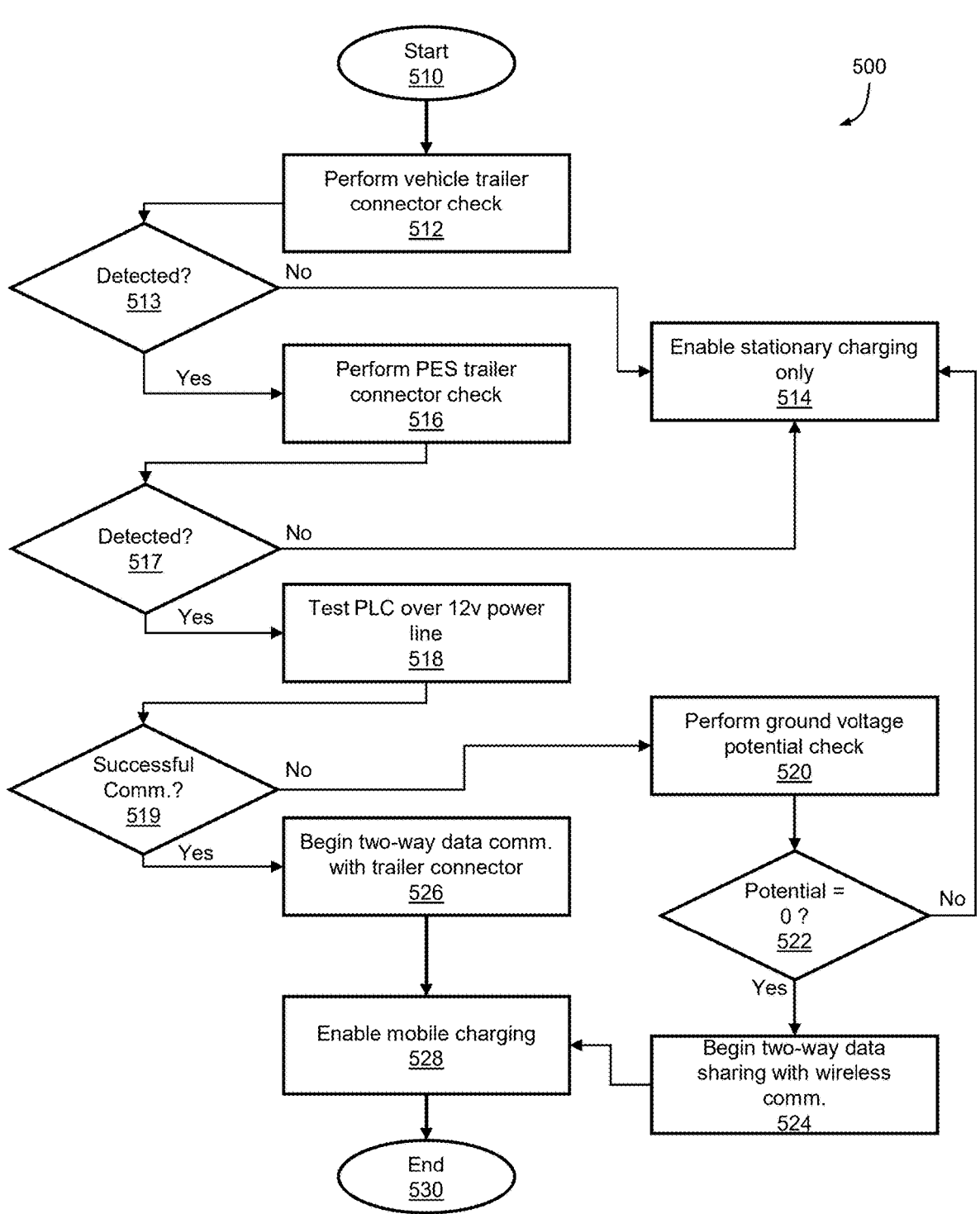
FIG. 5 is a flowchart of a handshake process for determining whether to initiate and/or allow mobile charging of a vehicle as performed by the PES management system of FIG. 1 in accordance with an embodiment.

With reference now to FIG. 5 and with continued reference to FIGS. 1-4, a flowchart provides an exemplary handshake process 500 for determining whether to initiate and/or allow mobile charging of the vehicle 10 as performed by the PES management system 100, in accordance with various examples. The handshake process 500 may start at 510. In some examples, the handshake process 500 may start upon connection of the charging connector 128 to the vehicle 10.

At 512, the handshake process 500 may include performing, with the vehicle controller 34, a first check for the trailer connector 116. If the trailer connector 116 is detected at 513, the handshake process 500 may include, at 516, performing, with the PES controller 70, a second check for the trailer connector 116. If the trailer connector 116 is again detected at 517, the handshake process 500 continues to 518. If at either 513 or 517 the trailer connector 116 is not detected, the handshake process 500 continues to 514 wherein the vehicle 10 is limited to charging while stationary. In some examples, the PES controller 70 may select a stationary MAC address and communicate the selection by PLC over the control pilot line 126c to the vehicle controller 34.

At 518, the handshake process 500 may include testing or initiating, with the vehicle controller 34, communication through the trailer connector 116 (e.g., on the 12 volt power line 118f). If the communication fails at 519, the handshake process 500 may include, at 520 performing, with the PES controller 70, a ground voltage potential check between the trailer connector 116 and a chassis ground connection. If the ground voltage potential is not equal to zero at 522, the handshake process 500 may continue to 514 and the vehicle 10 may be limited to charging while stationary. If the ground voltage potential is equal to zero at 522, two-way communication may be established between the vehicle 10 and the PES 58 via an alternative communication connection, such as a wireless connection (e.g., Bluetooth™). If the communication succeeds at 519, the handshake process 500 may include, at 526 establishing communication between the vehicle 10 and the PES 58 via the trailer connector 116.

Once communication has been established at 524 or 526, the handshake process 500 may include, at 528, allowing the vehicle 10 to charge while mobile. In some examples, the PES controller 70 may select a mobile MAC address and communicate the selection by PLC over the control pilot line 126c to the vehicle controller 34. In some examples, the PES 58 may validate a connection to the vehicle 10 by, for example, pressure sensor feedback from a smart trailer coupler system (e.g., as disclosed in U.S. Pat. No. 10,589, 581 incorporated herein in its entirety). The handshake process 500 may end at 530. In some examples, upon successful completion of the handshake process 500, a user may select a desired energy transfer mode and the charging may begin.

Various energy transfer modes may be used to transfer energy between the PES 58 and the vehicle 10. These energy transfer modes may include providing electrical power from the PES battery 60 to the vehicle battery 35 (i.e., forward charging) at a set charging rate, adjusting the charging rate upon various preprogrammed conditions, and providing electrical power from a regenerative braking system of the vehicle 10 to the PES battery 60. Nonlimiting examples of energy transfer modes include a maximum forward charge mode, a dolly/off grid mode, a target mode, and a weightless trailer mode.

In the maximum forward charge mode, the system 100 may provide electrical power from the PES battery 60 to the vehicle battery 35 a maximum charging rate of the vehicle 10 or the PES 58. During forward charging, the system 100 may monitor the SOC of both the vehicle 10 and the PES 58. If the SOC of the PES battery 60 is less than a PES SOC threshold, a notification may be generated and, potentially, forward charging may cease. If the SOC of the vehicle battery 35 is greater than a vehicle SOC threshold, at least some electrical power generated by the regenerative braking system may be transferred to the PES 58 (e.g., 50 percent). If the SOC of the vehicle battery 35 is less than the vehicle SOC threshold, forward charging may continue at the maximum charging rate until the SOC of the PES battery 60 drops below the PES SOC threshold.

In the dolly/off-grid mode, the system 100 will conserve the PES battery 60. For example, the forward charging rate may be set to zero. If the user has input a destination into a navigation system, the system 100 may evaluate the SOC of the vehicle battery 35 and advise the user regarding is the SOC of the vehicle battery 35 is sufficient to reach the destination. While in the dolly/off-grid mode, the system 100 may continuously or periodically monitor the SOC of the vehicle battery 35. If the SOC of the vehicle battery 35 is less than a dolly/off-grid threshold, the system 100 may change the active energy transfer mode to another mode, such as the maximum forward charge mode.

In the target mode, the user and/or the system 100 may set a target for either the SOC of the vehicle battery 35 or the SOC of the PES battery 60. When a target is set for the SOC of the vehicle battery 35, the system 100 continuously or periodically monitors the SOC of the vehicle battery 35 relative to the target. If the SOC of the vehicle battery 35 is greater than the target, the system 100 may conserve the PES battery 60. If the SOC of the vehicle battery 35 is less than the target, the system 100 may determine a charge rate and provide forward charging at the charge rate. If the SOC of the vehicle battery 35 subsequently becomes equal to the target, the system 100 may cease forward charging and continue to monitor the SOC of the vehicle battery 35. When a target is set for the SOC of the PES battery 60, the system 100 determines a charge rate and provides forward charging at the charge rate. If the SOC of the PES battery 60 subsequently becomes equal to the target, the system 100 may cease forward charging.

In the weightless trailer mode, the system 100 provides a forward charge at a charge rate that compensates or offsets the extra charge needed for towing the trailer 13. If the user has input a destination into a navigation system, the system 100 may determine the discharge rate of the vehicle 10 with and without the PES 58 per kilometer to the input destination. The system 100 may then determine a charge rate based on the difference between the discharge rate of the vehicle 10 with and without the PES 58. In some examples, the system 100 may evaluate whether the charge rate and the SOC of the PES battery 60 are capable of maintaining the weightless trailer mode to the destination, and generate a notification and/or change the energy transfer mode if a determination is made that the weightless trailer mode is not possible. If the user has not input a destination into a navigation system, the system 100 may continuously or periodically track the discharge rate of the vehicle 10 with the PES 58, estimate the discharge rate of the vehicle 10 without the PES 58, and determine the charge rate based on the difference between the discharge rate of the vehicle 10 with and without the PES 58.

Once the charge rate has been determined, the system 100 may provide forward charging at the charge rate. During forward charging, the system 100 may continuously or periodically track the discharge rate of the vehicle 10 with the PES 58, continuously or periodically estimate the discharge rate of the vehicle 10 without the PES 58, and continuously or periodically determine the charge rate based on the difference between the discharge rate of the vehicle 10 with and without the PES 58. If a difference between the set charge rate and the determined charge rate is greater than a weightless trailer threshold, the system 100 may update the set charge rate to the determined charge rate and provide forward charging at the updated charge rate. In some examples, at least some electrical power generated by the regenerative braking system may be transferred to the PES 58 (e.g., 50 percent) while in the weightless trailer mode.

The systems and methods disclosed herein provide various benefits over certain existing systems and methods. For example, the systems and methods disclosed herein promote efficient energy transfer between a PES and a vehicle by establishing two-way data communication between the vehicle PES, initiating electrical power transfer between the vehicle and the PES in accordance with an energy transfer mode, and adjusting the electrical power transfer based on various factors such as a status of the PES battery, a status of the vehicle battery, operating conditions of the vehicle, etc.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

establishing two-way data communication between a vehicle controller of a vehicle and a portable energy source (PES) controller of a PES coupled to the vehicle;

determining an energy transfer mode from more than one available energy transfer modes for transferring electrical power between a vehicle battery of the vehicle and a PES battery of the PES, wherein the more than one available energy transfer modes each include at least one charging rate and conditions for transferring the electrical power at each of the at least one charging rates;

initiating electrical power transfer between the vehicle battery and the PES battery in accordance with the energy transfer mode while the vehicle is being propelled by a propulsion system of the vehicle powered by the vehicle battery;

receiving, with the vehicle controller, PES data indicative of a status of the PES battery from the PES controller while the vehicle is being propelled by the propulsion system; and adjusting, with the vehicle controller, the electrical power transfer between the vehicle battery and the PES battery based on the status of the PES battery and in accordance with the conditions of the energy transfer mode, wherein the energy transfer mode is one of a plurality of the available energy transfer modes including:

a maximum forward charge mode wherein no forward charging is performed while a state of charge (SOC) of the PES battery is below a PES SOC threshold, forward charging is performed at a maximum charging rate while the SOC of the PES battery is above a PES SOC threshold and an SOC of the vehicle battery is below a vehicle SOC threshold, and electrical power transfer is initiated from a regenerative braking system of the vehicle to the PES battery while the SOC of the vehicle battery is above the vehicle SOC threshold;

a target mode wherein a target is set for a state of charge (SOC) of the PES battery, wherein the SOC of the vehicle battery or the SOC of the PES battery is monitored and the electrical power transfer is adjusted based on the SOC of the PES battery relative to the target, wherein forward charging is performed while the SOC of the PES battery is above the target and no forward charging is performed while the SOC of the PES battery is below the target;

a dolly/off-grid mode wherein a state of charge (SOC) of the vehicle battery is monitored, no forward charging is performed while the SOC of the vehicle battery is above a dolly/off-grid threshold, and the energy transfer mode is changed in response to the SOC of the vehicle battery being below the dolly/off-grid threshold, wherein the dolly/off-grid threshold is based on the SOC of the vehicle being sufficient to reach a destination input into a navigation system of the vehicle; or a weightless trailer mode wherein forward charge is provided at a charge rate that offsets an extra charge needed for transporting the PES with the vehicle, wherein the charge rate is based on a difference between a first discharge rate of the vehicle battery with the PES and a second discharge rate of the vehicle battery without the PES.

2. The method of claim 1, further comprising performing, with the vehicle controller, a safety check to verify that the PES is configured to provide the electrical power to the vehicle while the vehicle is in motion and to verify that the PES is coupled to the vehicle, wherein initiating the electrical power transfer is in response to a successful completion of the safety check.

3. The method of claim 1, wherein the vehicle and the PES are coupled with a seven pin trailer connector that includes a power line, wherein the two-way data communication is provided by powerline communication through the power line of the seven pin trailer connector.

4. A vehicle system for communication between a vehicle and a portable energy source (PES) coupled to the vehicle, comprising:

a vehicle battery configured to provide electrical power to a propulsion system of the vehicle;

a vehicle controller in operable communication with the vehicle battery, the vehicle controller configured to, by one or more processors:

establish two-way data communication between the vehicle controller and a PES controller of the PES;

determine an energy transfer mode from more than one available energy transfer modes for transferring electrical power between the vehicle battery and a PES battery of the PES, wherein the more than one available energy transfer modes each includes at least one charging rate and conditions for initiating electrical power transfer at each of the at least one charging rates;

initiate electrical power transfer between the vehicle battery and the PES battery in accordance with the energy transfer mode while the vehicle is being propelled by the propulsion system;

receive PES data indicative of a status of the PES battery from the PES controller while the vehicle is being propelled by the propulsion system; and adjust the electrical power transfer between the vehicle battery and the PES battery based on the status of the PES battery and in accordance with the conditions of the energy transfer mode, wherein the energy transfer mode is one of a plurality of the available energy transfer modes including:

a maximum forward charge mode wherein no forward charging is performed while a state of charge (SOC) of the PES battery is below a PES SOC threshold, forward charging is performed at a maximum charging rate while the SOC of the PES battery is above a PES SOC threshold and an SOC of the vehicle battery is below a vehicle SOC threshold, and electrical power transfer is initiated from a regenerative braking system of the vehicle to the PES battery while the SOC of the vehicle battery is above the vehicle SOC threshold;

a target mode wherein a target is set for a state of charge (SOC) of the PES battery, wherein the SOC of the vehicle battery or the SOC of the PES battery is monitored and the electrical power transfer is adjusted based on the SOC of the PES battery relative to the target, wherein forward charging is performed while the SOC of the PES battery is above the target and no forward charging is performed while the SOC of the PES battery is below the target;

a dolly/off-grid mode wherein a state of charge (SOC) of the vehicle battery is monitored, no forward charging is performed while the SOC of the vehicle battery is above a dolly/off-grid threshold, and the energy transfer mode is changed in response to the SOC of the vehicle battery being below the dolly/off-grid threshold, wherein the dolly/off-grid threshold is based on the SOC of the vehicle being sufficient to reach a destination input into a navigation system of the vehicle; or a weightless trailer mode wherein forward charge is provided at a charge rate that offsets an extra charge needed for transporting the PES with the vehicle, wherein the charge rate is based on a difference between a first discharge rate of the vehicle battery with the PES and a second discharge rate of the vehicle battery without the PES.

5. The vehicle system of claim 4, wherein the vehicle controller is configured to, by the one or more processors, perform a safety check to verify that the PES is configured to provide the electrical power to the vehicle while the vehicle is in motion and to verify that the PES is coupled to the vehicle, wherein initiating the electrical power transfer is in response to a successful completion of the safety check.

6. The vehicle system of claim 4, wherein the vehicle and the PES are coupled with a seven pin trailer connector that includes a power line, wherein the vehicle controller is configured to, by the one or more processors, provide the two-way data communication by powerline communication through the power line of the seven pin trailer connector.

7. A vehicle, comprising:

a propulsion system;

a vehicle battery configured to provide electrical power to the propulsion system sufficient for operation of the propulsion system;

a vehicle controller in operable communication with the propulsion system and the vehicle battery, the vehicle controller configured to, by one or more processors:

establish two-way data communication between the vehicle controller and a portable energy source (PES) controller of the PES;

determine an energy transfer mode from more than one available energy transfer modes for transferring electrical power between the vehicle battery and a PES battery of the PES, wherein the more than one available energy transfer modes each include at least one charging rate and conditions for transferring the electrical power at each of the at least one charging rates;

initiate electrical power transfer between the vehicle battery and the PES battery in accordance with the energy transfer mode while the vehicle is being propelled by the propulsion system;

receive PES data indicative of a status of the PES battery from the PES controller while the vehicle is being propelled by the propulsion system; and adjust the electrical power transfer between the vehicle battery and the PES battery based on the status of the PES battery and in accordance with conditions of the energy transfer mode, wherein the vehicle controller is configured to, by the one or more processors, execute the energy transfer mode in accordance with one of a plurality of the available energy transfer modes including:

a maximum forward charge mode wherein no forward charging is performed while a state of charge (SOC) of the PES battery is below a PES SOC threshold, forward charging is performed at a maximum charging rate while the SOC of the PES battery is above a PES SOC threshold and an SOC of the vehicle battery is below a vehicle SOC threshold, and electrical power transfer is initiated from a regenerative braking system of the vehicle to the PES battery while the SOC of the vehicle battery is above the vehicle SOC threshold;

a target mode wherein a target is set for a state of charge (SOC) of the PES battery, wherein the SOC of the vehicle battery or the SOC of the PES battery is monitored and the electrical power transfer is adjusted based on the SOC of the PES battery relative to the target, wherein forward charging is performed while the SOC of the PES battery is above the target and no forward charging is performed while the SOC of the PES battery is below the target;

a dolly/off-grid mode wherein a state of charge (SOC) of the vehicle battery is monitored, no forward charging is performed while the SOC of the vehicle battery is above a dolly/off-grid threshold, and the energy transfer mode is changed in response to the SOC of the vehicle battery being below the dolly/off-grid threshold, wherein the dolly/off-grid threshold is based on the SOC of the vehicle being sufficient to reach a destination input into a navigation system of the vehicle; or a weightless trailer mode wherein forward charge is provided at a charge rate that offsets an extra charge needed for transporting the PES with the vehicle, wherein the charge rate is based on a difference between a first discharge rate of the vehicle battery with the PES and a second discharge rate of the vehicle battery without the PES.

8. The vehicle of claim 7, wherein the vehicle controller is configured to, by the one or more processors, perform a safety check to verify that the PES is configured to provide the electrical power to the vehicle while the vehicle is in motion and to verify that the PES is coupled to the vehicle, wherein initiating the electrical power transfer is in response to a successful completion of the safety check.

9. The vehicle of claim 7, wherein the vehicle and the PES are coupled with a seven pin trailer connector that includes a power line, wherein the vehicle controller is configured to, by the one or more processors, provide the two-way data communication by powerline communication through the power line of the seven pin trailer connector.

10. The method of claim 1, further comprising initiating electrical power transfer from a regenerative braking system of the vehicle to the PES battery while a state of charge (SOC) of the vehicle battery is above a vehicle SOC threshold.

11. The vehicle of claim 4, wherein the vehicle controller is configured to, by the one or more processors, initiate electrical power transfer from a regenerative braking system of the vehicle to the PES battery while a state of charge (SOC) of the vehicle battery is above a vehicle SOC threshold.

* * * * *